United States Patent [19]

Nakayama

[11] Patent Number: 5,364,653

[45] Date of Patent: Nov. 15, 1994

[54] FRUIT AND NUT-CONTAINING CONFECTIONARY CANDY AND METHOD OF PREPARATION

[76] Inventor: Raymond M. Nakayama, 120 Opihikao Way, Honolulu, Hi. 96825

[21] Appl. No.: 987,896

[22] Filed: Dec. 3, 1992

[51] Int. Cl.$^5$ .......................... A23G 3/00; A23L 3/44
[52] U.S. Cl. .................................. 426/660; 426/384; 426/615; 426/632
[58] Field of Search ................ 426/660, 632, 615, 384

[56] References Cited

U.S. PATENT DOCUMENTS

| | | | |
|---|---|---|---|
| 4,355,050 | 10/1982 | Butland | 426/660 |
| 4,423,085 | 12/1983 | Chen et al. | 426/632 |
| 4,543,262 | 9/1985 | Michnowski | 426/660 |
| 4,605,561 | 8/1986 | Lang | 426/660 |
| 4,744,995 | 5/1988 | Robinson | 426/454 |
| 4,837,042 | 6/1989 | Vajda et al. | 426/615 |
| 4,888,187 | 12/1989 | Given, Jr. et al. | 426/102 |

OTHER PUBLICATIONS

Chocolate Artistry, pp. 14–17 published by Contemporary Books (1983).

*Primary Examiner*—Helen Pratt
*Attorney, Agent, or Firm*—Skjerven, Morrill, MacPherson, Franklin & Friel

[57] ABSTRACT

A confectionary candy product is formed by first preparing by squeezing a fruit to form a fruit concentrate of 40 to 60 weight percent of solids either directly or by freeze-drying and reconstituting with water to that solids content. The fruit preferably is passion fruit, guava, mango, pineapple or papaya. The fruit concentrate in the amount of from 5 to 30 weight percent is mixed with from 50 to 90 weight percent of a sweet-flavored or fruit-flavored compound coating to form a base mixture to which from preferably 15 to 25 weight percent of chopped or small whole nuts are admixed. The resultant final mixture is formed into predetermined volumetric shapes by hand or in a mold, chilled to set the final product, removed from the chiller and the final product then packaged.

9 Claims, 1 Drawing Sheet

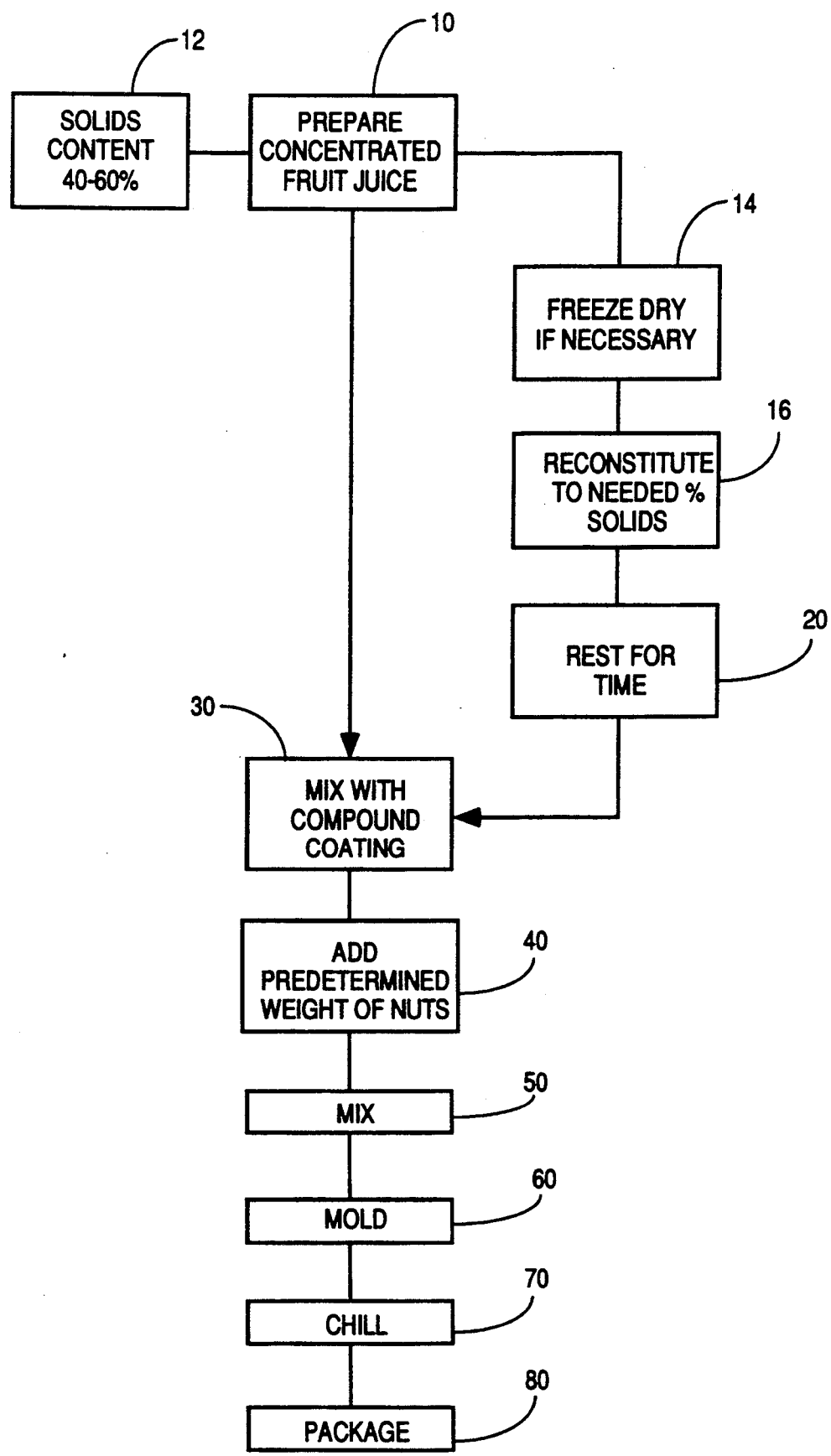

FRUIT AND NUT-CONTAINING CONFECTIONARY CANDY AND METHOD OF PREPARATION

BACKGROUND OF THE INVENTION

This invention relates to a fruit and nut-containing confectionary candy edible product More particularly the invention is directed to a moldable candy product including a natural, preferably exotic fruit juice concentrate, chopped nuts and compound coating.

With the continuing trend in food products incorporating natural food components, the present objective is to produce a confectionary candy which contains a combination of natural fruits and nuts which is nutritional and beneficial.

Various candy products have been formulated in the past using sugar and nuts; ground compressed fruit and nuts; fruit-containing chocolate products; and fruit centers in a caramel/nut layer encapsulated by an exterior chocolate-flavored compound coating. These are exemplified, respectively, in U.S. Pat. No. 4,423,085 in which chopped nuts are added to a sugar-saturated syrup, with and without cocoa powder, starch, gum enzyme, vitamin C, fruit juice concentrate, honey, molasses or combination thereof and the mix crystallized and dried; U.S. Pat. No. 4,744,995 where compressed fruit and nuts are mixed, ground, extruded and compressed into an edible product; U.S. Pat. No. 4,837,042 where emulsified melted chocolate is homogenized with an extra sugar containing fruit concentrate and a lyophilic additive, and filled into molds and used for coating a corpora such as whole strawberries, banana sections, cherries, raisins and even ants; and U.S. Pat. No. 4,888,187 where a fruit center is contained within a caramel/nut coating and an outer coating of chocolate-flavored compound coating is provided. "Compound coating" as used in the prior art and in this specification is a chocolate substitute using 45–55% high grade sugar with either hydrogenated or fractionated palm kernel oil, a lauric fat base, and 15–25% milk solids with appropriate emulsifiers, flavoring and food colorants.

None of these prior art products involve the combination of a mix of a fresh fruit concentrate having about 40% to about 60% weight percent of solids, a compound coating and tree or ground nuts. Further none of the known art provides for the freeze drying of a natural fruit puree to concentrate the taste and flavor while retaining natural color, aroma and nutritional value of the fresh fruit, which is then mixed (reconstituted) with water to a thick paste of 40 to 60% solids and placed at rest to release flavor and provide uniform moisture throughout and which is subsequently mixed with compound coating and nuts.

SUMMARY OF THE INVENTION

The confectionary candy product of this invention utilizes concentrated fruit juices preferably from passion fruit and guava fruit indigenous to the Hawaiian Islands, which after processing must have from 40 to 60 weight percent solids. If from initial processing, the fruit juice puree is of less concentration, the juice substance must be frozen and freeze-dried to about 1 to about 3 weight percent water at about 25° C. Sufficient water is then added to the freeze-dried fruit to obtain a concentrate of from about 40 to 60 weight percent of fruit solids. The resultant fruit concentrate is a paste which is allowed to rest for about 12–24 hours to release flavor into the paste and provide uniform moisture throughout the paste.

The resultant flavorful paste is then mixed thoroughly with a compound coating to form a base mixture. Small whole or chopped nuts are added to the base mixture either with or after the mixing of the concentrate and the compound coating. The nuts consist of whole nuts or pieces, typically chopped pieces, of nuts such as peanuts, cashew nuts, almonds, walnuts, pistachios, beechnuts, pecans, hazelnuts, macadamia nuts, Brazil nuts, pine nuts, coconuts and mixtures thereof. The resultant final mixture is thoroughly mixed and then poured into molds of a selected volumetric shape and size, and chilled for about an hour at about 5° C. After chilling the candy product is removed from the molds for packing, wrapping and shipment. The compound coating may be chocolate-flavored or artificial fruit-flavored or sweet-flavored, i.e. sugar added, and colored to replicate the fruit of the puree. The result is a natural confectionary product of relatively low calorific content which is nutritious, a source of vitamins and minerals and with a fresh fruit-flavor not existent in cooked candy products.

BRIEF DESCRIPTION OF THE DRAWING

The single Figure is a flow chart illustrating the steps for preparing a fruit-nut-compound coating confectionary candy product in accordance with this invention.

DETAILED DESCRIPTION

The present invention comprises a fruit and nut and compound coating confectionary candy product and a method for its preparation.

As seen in this Figure, a fruit juice concentrate is first prepared. The selected fruits are herein termed as exotic fruits indigenous to or commonly associated with the Hawaiian Islands. Preferably the fruit is selected from the group consisting passion fruit, guava fruit, mango fruit, pineapple, and papaya fruit is first prepared in step 10 so that a concentration of from about 40 to 60 weight percent of fruit solids is obtained. The concentrate may be a normal concentrate resultant from the squeezing and processing only of these fruits in step 12, or can be prepared from juices having lower solids content (weak concentration) by first pureeing the squeezed juice, and then freeze-drying the puree to obtain the resultant dried powder. The powder may require grinding to a finer-powder to give smoothness. Subsequently, in step 16, water is added to form a paste having the required 40 to 60 weight percent of fruit solids. The paste is allowed to rest in step 20 for about 12 to 24 hours to allow the fruit flavor to be released into the overall paste. While a freezer drier of the type described in Example 2 may be employed, freeze-drying services may be obtain from others including Mercer Processing, Inc., Park Blvd., Palo Alto, Calif. The paste is then mixed with a compound coating of a sweet flavor and colored compound coating 30 and then chopped nuts, preferably macadamia nuts, preferably are added in step 40 and mixed in step 50 to give a specific Hawaiian flavor.

"Compound coating" is a chocolate substitute using 45–55% high grade sugar with either hydrogenated or fractionated palm kernel oil, a lauric fat base, and 15–25% milk solids with appropriate emulsifiers, flavoring and food colorants. Reference is made to pages 15–17 of "Chocolate Artistry" published by Contemporary Books in 1983 which includes a more detailed discussion of compound coatings. The nuts consist of whole nuts or pieces, typically chopped pieces, of nuts such as peanuts cashew nuts, almonds, walnuts, pistachios, beechnuts, pecans, hazelnuts, macadamia nuts, Brazil nuts, pine nuts, coconuts and mixtures thereof.

It has been found that about from 5 to 30 weight percent of fruit concentrate of the prescribed solids concentration, about from 50 to 90 weight percent of compound coating and about from zero to 40 weight percent of chopped nuts result in a moldable and flavorful candy product. In a preferred embodiment from about 12 to 25 weight percent of fruit concentrate of the prescribed solids concentration, from about 60 to 70 weight percent of compound coating and from about 15 to 25 weight percent of chopped nuts gives a superior candy. Specific formulations within these percentages can be employed as determined by aroma, taste, acidity and particular fruit-concentrate and pulp content.

The resultant final mixture is then molded in step 60 normally by hand and placed on a chill plate or packed into a plastic mold of desired bite-size or other shapes, and then chilled in step 70 for about one hour at about 5° C. until the ingredients are set. Finally the molded products are removed from the chill plate or chill mold for wrapping or other packaging in step 80, ready for sale.

The compound coating may be selected to enhance the actual color of the fruit utilized and to enhance the flavor of the overall confectionary candy. As distinguished from cocoa butter and regular chocolate, the compound coating portion of the product of this invention will not "bloom", a condition that gives chocolate stored above 70° F. (21° C.), a grey appearance due to some of the cocoa butter crystals melting and rising. While macadamia nuts are preferred, chopped to about 10 mm maximum particle size, other roasted, whole, chopped or pulverized nuts including peanuts, almonds, beechnuts, Brazil nuts, coconuts, cashew nuts, chestnuts, hazelnuts, hickory nuts, pecans, pine nuts, pistachio nuts, walnuts and other nuts can be employed.

The following examples illustrate various embodiments of the confectionary candy products and their manufacture.

EXAMPLE 1

A concentrate of passion fruit juice having a Brix measurement of 50 Brix or 52% moisture or 48% by weight of fruit solids was prepared. A compound coating comprising 50% high-grade sugar, 20% milk solids, and palm kernel oil and emulsifiers, the coating being available from Merkins Chocolate of Los Angeles, Calif. and designated as Rainbow Yellow #447838, was heated to about 48° C. so that the compound was in molten condition. The molten compound coating in an amount of 73 weight percent was added to 9 weight percent of the fruit concentrate and mixed thoroughly in a food warmer manufactured by Medalie Manufacturing Co. An 18% by weight portion of chopped macadamia nuts was added and this mixture thoroughly mixed. The fruit concentrate, compound coating and nut final mixture had a consistency such that it could be poured into standard plastic chill molds. The molds with the final mixture therein were then chilled for about one hour at 5° C. to set the product, removed from the mold and prepared for wrapping or other packaging.

EXAMPLE 2

The procedure of Example 1 was repeated using a frozen guava fruit puree of 6 weight percent solids. This puree was freeze dried to about 1%–2% water. The dried juice powder was finely ground to the consistency of household flour or powdered sugar and then reconstituted by adding water at 25° C. to form a paste having a 50 weight percent of ground fruit solids. A mixture of 10 weight percent of the paste, 78 weight percent of a Merkins compound coating, namely, Rainbow Pink #448,339 and 12 weight percent of chopped macadamia nuts was formed. The remainder of the mixing and molding steps of Example 1 were performed to form the candy product.

EXAMPLE 3

The procedure of Example 1 was repeated utilizing 10% by weight of passion fruit concentrate of 50% solids, 70% by weight of the Example 1 compound coating. The remaining 20 weight percent of the final mixture comprised macadamia nuts chopped into particles of about 10 mm in size. Similarly to Example 1 these constituents were mixed, molded, chilled and packaged into the final edible candy product.

The above description of embodiments of this invention is intended to be illustrative and not limiting. Other embodiments of this invention will be obvious to those skilled in the art in view of the above disclosure.

I claim:

1. A confectionary candy product comprising a mixture of about 5% by weight to about 30% by weight of a freeze-dried fruit concentrate; from about 50% by weight to about 90% by weight of compound coating; and from about 0% by weight to about 40% by weight of nuts, and wherein mixed portions of said product are moldable into desired shapes;
   wherein said fruit concentrate is guava fruit; and
   in which said guava fruit is a freeze-dried fruit concentrate reconstituted with water to said about 40 to about 60 weight percent solids.

2. A method of for preparing a confectionary candy product comprising:
   preparing a fruit concentrate by squeezing a natural fruit to form a fruit puree;
   freeze drying said fruit puree to a water content of from about 1 to about 3 weight percent;
   adding water to the dried concentrate to form a paste of the fruit concentrate of about 40 to 60 weight percent of solids;
   mixing 5 to 30 weight percent of a final mixture of said concentrate with from 50 to 90 weight percent of the final mixture of compound coating to form a base mixture;
   adding a predetermined weight of nuts to the base mixture;
   mixing said nuts and the base mixture to form the final mixture; and
   molding portions of the final mixture into desired volumetric shapes.

3. The method of claim 2 further including resting the resultant fruit concentrate paste for from 12 to 24 hours to release flavor into the paste and provide uniform moisture therein.

4. The method of claim 2 wherein said fruit concentrate is selected from the group consisting of passion fruit, guava, mango, pineapple, and papaya.

5. The method of claim 2 wherein said nuts are selected from the group consisting of peanuts, cashew nuts, almonds, walnuts, pistachios, chestnuts, hickory nuts, beechnuts, pecans, hazel nuts, macadamia nuts, brazil nuts, pine nuts and coconuts.

6. A confectionary candy product consisting essentially of a mixture of less than about 30% weight percent of freeze-dried fruit concentrate, at least 50% by weight of compound coating of a color replicating the color of the fruit concentrate and from about 0% by weight to about 40% by weight of nuts, and wherein mixed portions of said product are moldable into fruit-colored desired shapes.

7. The confectionary candy product of claim 6 wherein said fruit concentrate is selected from the group consisting of passion fruit, guava, mango, pineapple, and papaya.

8. The confectionary candy product of claim 6 wherein said nuts are selected from the group consisting of peanuts, cashew nuts, almonds, walnuts, pistachios, chestnuts, hickory nuts, beechnuts, pecans, hazel nuts, macadamia nuts, brazil nuts, pine nuts and coconuts.

9. The confectionary candy product of claim 6 wherein from about 5 to about 30 weight percent of said freeze-dried fruit concentrate, from about 50 to about 90 weight percent of compound coating and a remainder of chopped nuts forms said mixture.

* * * * *